United States Patent [19]
Fula et al.

[11] Patent Number: 5,350,304
[45] Date of Patent: Sep. 27, 1994

[54] METHOD OF REHABILITATING MUSCLES AND NEUROLOGICAL PATHWAYS IN A PATIENT USING A MULTIFUNCTIONAL THERAPEUTIC WORKSTATION KIT

[75] Inventors: Karen A. Fula; Carl E. Krippendorf, both of Milwaukee, Wis.

[73] Assignee: Smith & Nephew Rolyan, Inc., Memphis, Tenn.

[21] Appl. No.: 28,523

[22] Filed: Mar. 9, 1993

Related U.S. Application Data

[63] Continuation of Ser. No. 803,091, Dec. 5, 1991, abandoned.

[51] Int. Cl.$^5$ ............................................. G09B 19/00
[52] U.S. Cl. ..................................... 434/258; 312/213
[58] Field of Search ........................ 434/258, 247, 259; 446/108, 110–115, 118, 122, 123; 312/213, 257.1

[56] References Cited

U.S. PATENT DOCUMENTS

| | | | |
|---|---|---|---|
| 1,069,411 | 8/1913 | Greene | 312/213 X |
| 2,404,065 | 7/1946 | Hill | 312/213 X |
| 2,708,329 | 5/1955 | McKee . | |
| 2,774,808 | 12/1956 | Bullock | 312/257.1 X |
| 3,339,920 | 9/1967 | Moritz . | |
| 3,846,002 | 11/1974 | Floetotto | 312/257.1 X |
| 4,116,510 | 9/1978 | Franco | 312/257.1 |
| 4,183,154 | 1/1980 | Dykes . | |
| 4,571,200 | 2/1986 | Serna . | |
| 4,635,411 | 1/1987 | Kurzen . | |
| 4,795,351 | 1/1989 | Vermette . | |
| 4,978,301 | 12/1990 | Dodge . | |

FOREIGN PATENT DOCUMENTS 1401801  7/1975  United Kingdom ................ 446/113

Primary Examiner—Gene Mancene
Assistant Examiner—Jeffrey A. Smith
Attorney, Agent, or Firm—Pravel, Hewitt, Kimball & Krieger

[57] ABSTRACT

A multi-functional therapeutic workstation which can simulate a multitude of job tasks. The workstation kit includes five panel designs, right angled elbows, nuts and bolts, and can be assembled into a variety of modules requiring the exercise of varying levels of cognitive and motor skills. Depending upon the position of the patient relative to the workstation kit, and the module that the patient is required to construct, the assembly rehabilitates both muscles as well as neurological pathways.

4 Claims, 12 Drawing Sheets

FIG. 27
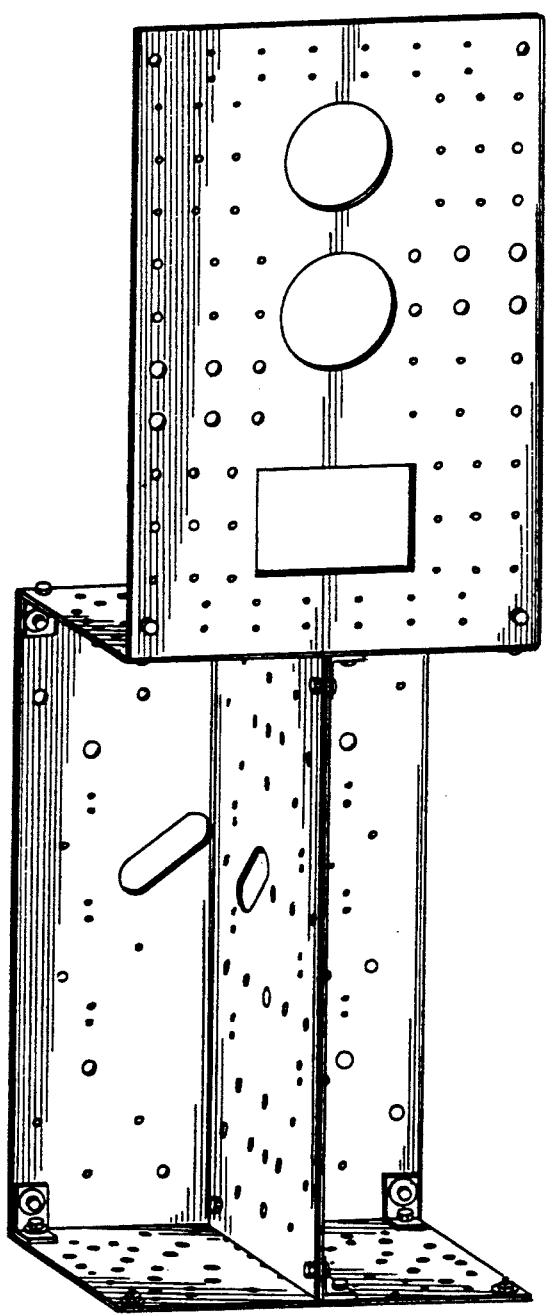
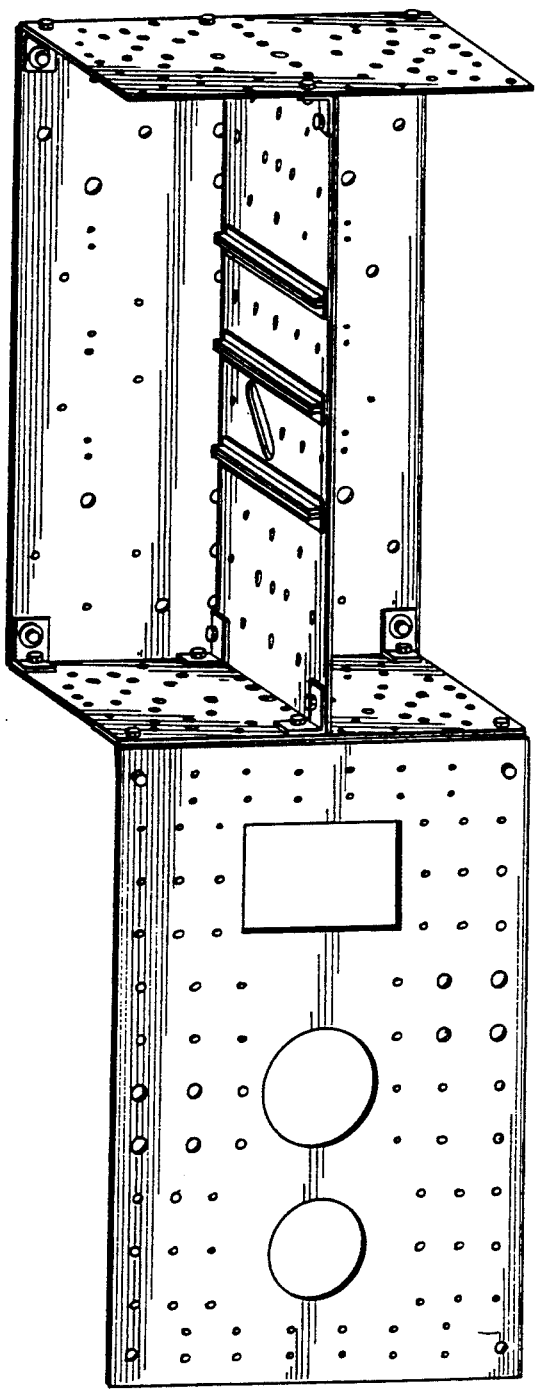
FIG. 28

METHOD OF REHABILITATING MUSCLES AND NEUROLOGICAL PATHWAYS IN A PATIENT USING A MULTIFUNCTIONAL THERAPEUTIC WORKSTATION KIT

This is a continuation of co-pending application Ser. No. 07/803,091 filed on Dec. 5, 1991, and now abandoned.

BACKGROUND OF THE INVENTION

1. Field of the Invention

This invention relates to a multi-functional therapeutic workstation which can simulate a multitude of job tasks. The workstation is ideally suited for patients recovery from traumatic hand injury, upper extremity injury, back or lower extremity injury, traumatic brain injury or other neurological disorders. More specifically, the multi-functional workstation kit consists of five panel designs with right angle brackets, nuts and bolts that can be assembled into several modules. Hand tools must be used to assemble most of the nuts, bolts, washers and screws.

2. Description of the Related Art

There exists a need for a therapeutic device for patients that have suffered traumatic injuries or illness and that have a need to exercise the healing limbs or neurological pathways so that the patient may be rehabilitated and resume normal activities. These injuries may, for instance, include traumatic hand injury, upper extremity injury, back or lower extremity injury, traumatic brain injury or other neurological and medical disorders.

In an earlier effort to meet this need, U.S. Pat. No. 4,795,351 describes a method and device in which the patient is required to perform manual operations within a visually obscured enclosure. Partitions are provided within the enclosure to simulate the performance of mechanical operations such as the placing and tightening of nuts on bolts inside the enclosure. However, this patent only addresses fine motor skills such as placing nuts on bolts and does not address the rehabilitation of those muscles which control other ranges of motions. Indeed, the device is limited to fine motor control of these muscles of the hand.

What is needed is a device that is versatile and that can be used to rehabilitate patients suffering from a wide variety of impairments. For instance, the device should be capable of inducing the patient to exercise the complete upper extremity range of motion, should encourage muscle strengthening and muscle endurance while also providing tool handling/prehension tasks with either low or high torque activity. Further, the device should allow the manipulation of tools to exercise those muscles that control fine motor coordination as well as gross motor coordination. It is also desirable that the device could be juxtaposed relative to the patient so as to exercise sitting and standing tolerance, kneeling, bending and squatting tolerance, as well as supine, side lying or overhead work tolerance. Furthermore, the device should also be suitable for simulation of working in a confined space and should exercise vertical, horizontal and diagonal reaching tolerances. It is furthermore desirable that the therapeutic device should not only address physical activities but should also stimulate cognitive, perceptual motor skills such as following directions, problem solving and abstract thinking, redevelopment of organizational skills, extending attention span, replication of detail and design copy, understanding spatial relationships, discriminating between the left side and the right side, visual sequencing, motor planning, sorting and sequencing of tasks, and the like. Therefore, it is desirable that the therapeutic device be able to rehabilitate both physical muscular activity as well as neurological activities, such as cognitive perceptual motor skills, and should simulate job tasks.

SUMMARY OF THE INVENTION

The invention provides a multi-functional workstation kit which comprises five basic panels with right angle brackets, bolts and nuts that can be assembled into several positions. The assembly of these panels into various modules, provides muscular exercise therapy, range of motion and job simulation while at the same time stimulating cognitive perceptual motor skills. The panels include left, middle and right panels, top and bottom panels and shelves. Thus, there are a total of five different panel designs.

During therapy, an objective is set for the patient which requires the construction of a module which includes the fastening together of at least two of these panels. In more complex exercises, the patient will be required to assemble a larger number of panels, depending upon the motor and cognitive skills that the therapist determines should be exercised.

The panels are each of a specific design, as shown in FIGS. 1-5, and are generally clamped, bolted or screwed together with right angle brackets at the corners. The right angle brackets are designed so that when two panels are bolted together at right angles to each other, the right angle brackets at the corners will rest one on top of the other and the upper surface of the right angle bracket will remain flush with the upper or lower edges of the panels as shown in FIG. 6A.

The panels may be fabricated of sheet metal, or any other suitable, preferably lightweight, thin material. For instance, the panels may be fabricated from an organic polymeric composition or a composite of an organic polymer. The panels are each uniquely designed with the exception that the top panel is a mirror image of the bottom panel. The apertures shown in the left and right panels are intended as hand grips so that, in certain modules, the patient may be readily able to lift and manipulate the module. The middle panel is supplied with apertures through which a patient may extend his hand and arm for manipulating washers, tools, nuts and bolts inside or outside the assembly. While only three apertures are shown, it is understood that apertures of different shapes and sizes will also suffice to permit the performance of this function.

The above-described multi-functional workstation can simulate a multitude of job tasks and can meet several treatment objectives, depending upon the module that the patient is required to construct and the patient's position relative to the work pieces during the construction. Further, depending upon the complexity of the module that the patient is required to construct, the workstation also exercises the patient's cognitive skills. Therefore, the invention multi-functional workstation is able to provide rehabilitative therapy for both physical and neurological trauma or illness.

BRIEF DESCRIPTION OF THE DRAWINGS

FIG. 27 is an assembly for exercising in the overhead shoulder position.

FIG. 28 is an assembly for exercising in the kneeling or squatting position.

DETAILED DESCRIPTION OF THE PREFERRED EMBODIMENTS

Assembly of the invention multi-functional workstation kit provides a versatile therapeutic activity which can simulate multiple job tasks. The workstation is ideally suited for patients recovering from traumatic hand injury, upper extremity injury, back or lower extremity injury, traumatic brain injury, or other neurological or physiological disorders. The use of this multi-functional workstation kit can be of benefit to hand rehabilitation centers, orthopedic rehabilitation departments, work hardening centers, vocational rehab or work training centers, head trauma or neurological rehabilitation centers, and mental health facilities.

The multi-functional workstation kit is designed for use as a therapeutic training activity. Furthermore, it provides an outlet for creative expression that caters to many occupations including, but not limited to, air conditioning repair work, aircraft mechanics, assembly workers, automotive mechanics, carpentry, electrical work, electronic assembly and repair work, routine maintenance work, machine work, masonry and concrete work, plumbing, small engine repair, sheet metal work, and the like.

In assembling the workstation into one of many arrangements or modules, the following physical activities can be addressed: complete upper extremity range of motion; whole body range of motion; muscle strengthening; muscle endurance improvement; tool handling and prehension tasks with low or high torque activity; fine motor coordination; gross motor coordination; desensitization and sensory input; sitting and standing tolerance; kneeling, bending and squatting tolerance; supine or side lying tolerance; overhead work tolerance; confined work space tolerance; and vertical, horizontal and diagonal reaching tolerance. The workstation also provides a stimulating medium for developing the following cognitive perceptual motor skills: following directions, problem solving and abstract thinking, organizational skill development, attention span development, replication of detail and copying of designs, understanding spatial relationships, left and right discrimination, positioning in space perception, visual sequencing, motor planning, form and shape consistency recognition, sorting and sequencing tasks, depth perception, and the like.

The multi-functional workstation consists of five panels, with right angle brackets, nuts, washers, bolts, shelves and hand tools, and can be assembled into several modules or "positions." Since each patient's treatment program will differ, the modules to be constructed and the juxtaposition of the module relative to the patient will vary.

Figure 1:
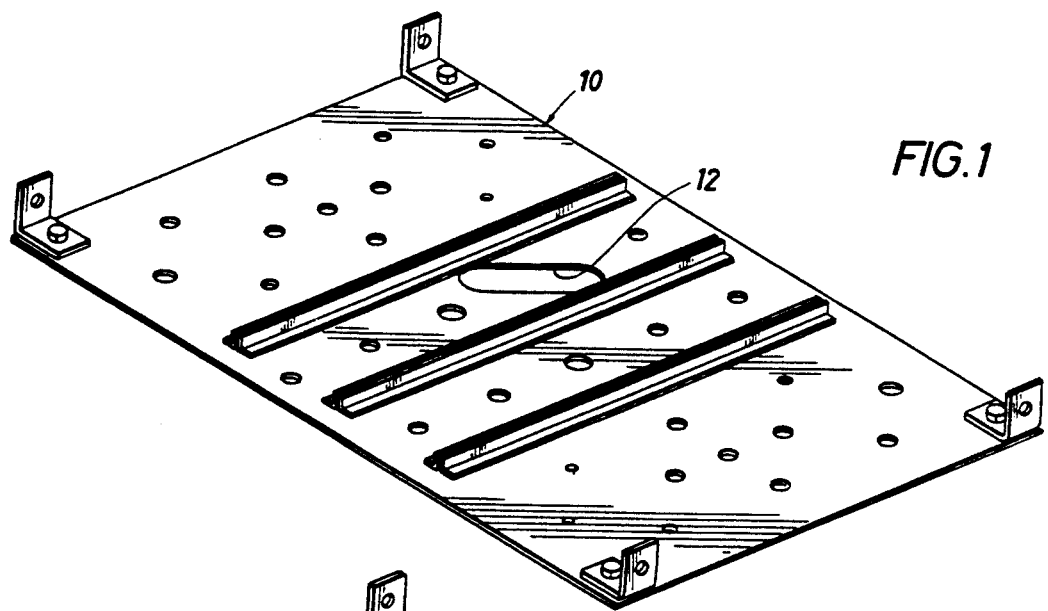
FIG. 1 shows a right-hand panel with right angle brackets at each corner and three pairs of struts into which the edge of a shelf may slide.
Figure 2:
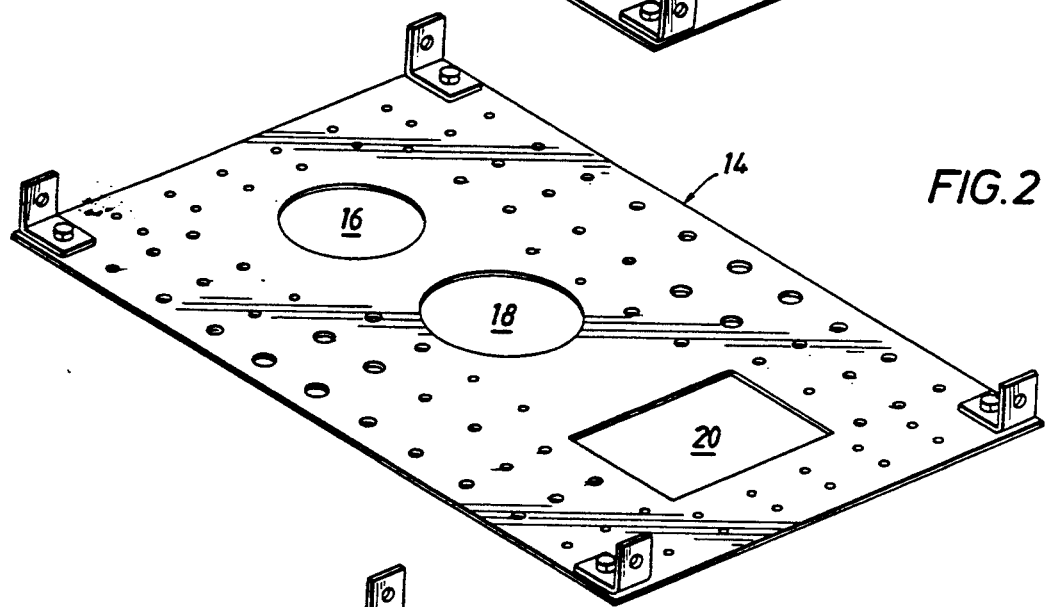
FIG. 2 is a middle panel with right angle brackets at each corner and three apertures through which an individual may insert a hand or arm.
Figure 3:
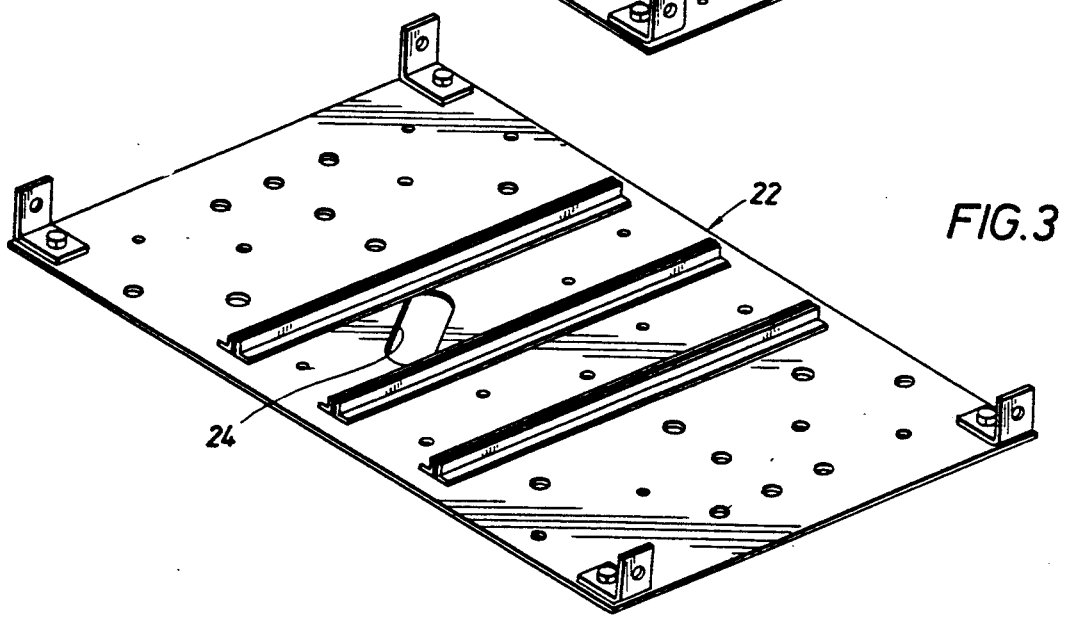
FIG. 3 is a left-hand panel with right angle brackets at each end and three pairs of struts into which the edges of a shelf may slide.
Figure 4:
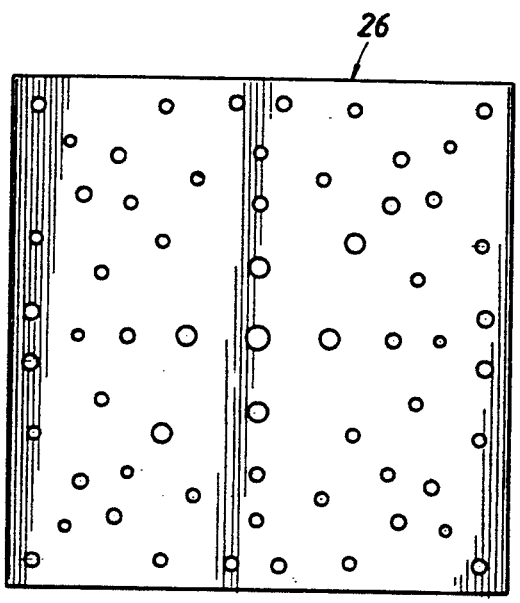
FIG. 4 is a top or bottom panel.
Figure 5:
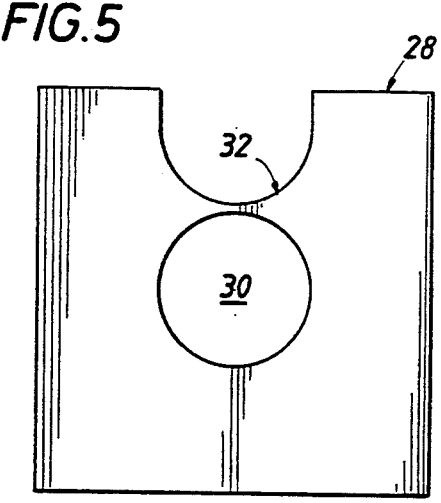
FIG. 5 is a shelf panel.
Figure 5A:
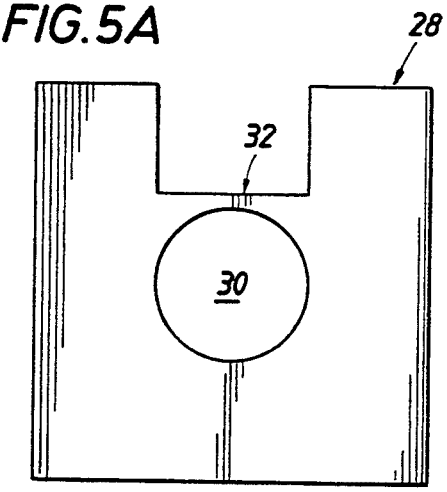
FIG. 5A is a shelf panel.

The basic panels are shown in FIGS. 1 through 5. FIG. 1 shows a left-hand side panel 10 with a plurality of holes drove through the panel. Further, the left-hand panel has an aperture 12 for holding or grasping. The middle panel 14 is also supplied with a plurality of holes for receiving bolts and has, in addition, several apertures through which a patient may insert his or her hand or arm. These apertures are shown as 16, 18 and 20. It will be understood that more or fewer apertures may be used and that the size and shape of the apertures may vary, as long as patient is able to insert his or her hand or arm through the aperture. A right-hand panel 22 is shown in FIG. 1 with hand-grip 24. This panel is also supplied with several holes for receiving bolts. FIG. 4 shows a top or bottom panel 26 which is square in shape and which is also supplied with holes for receiving bolts. Shelving for use in constructing some of the modules is shown in FIG. 5 and FIG. 5A. The shelf 28 is typically supplied with an aperture 30 through which a patient may extend an arm for manipulating nuts, bolts and the like. Moreover, a section may be removed from one edge 32 of the shelf to provide a gap through which a patient may insert his hand or arm once the shelf is in place.

In order to better understand the functioning and purpose of the multi-functional workstation kit, the construction of various modules and the purpose for their construction will be explained. It will be understood that the usefulness of the invention is not limited to those assembled modules which are described herein.

Figure 6:
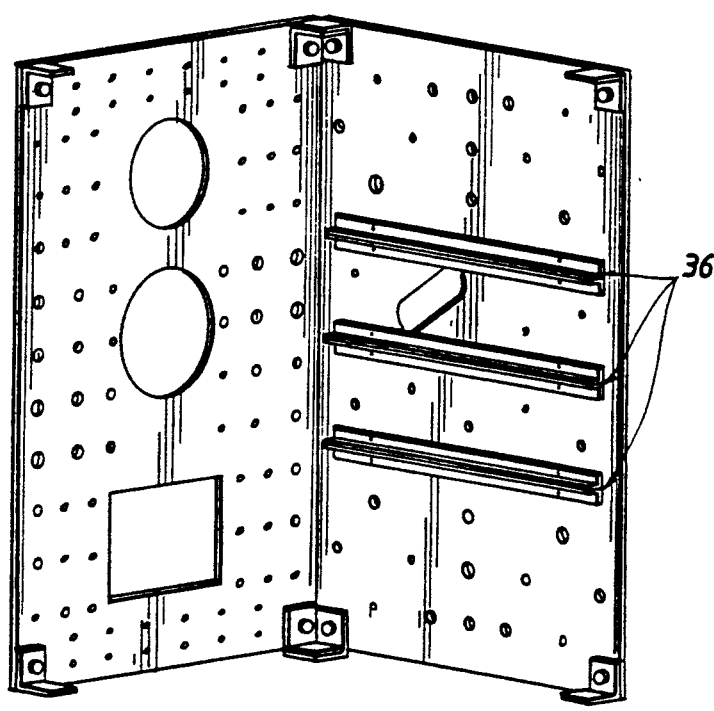
FIG. 6 shows a middle panel attached to a left-hand panel with right angle brackets.
Figure 6A:
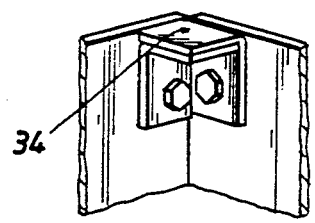
FIG. 6A is an enlarged representation of a right angle bracket at one of the corners of FIG. 6.

The "standard position" or standard module relates to the construction of a module which incorporates the whole body range of motion. This position also addresses gross and fine motor skills in a confined work space through the assembly of nuts, bolts and washers, with or without the use of hand tools. As an optional activity, string may be threaded through panels to simulate wiring. To assemble this module, the following cognitive skills will be used: a higher level of attention span, ability to follow directions, replication of details, problem solving, and left and right discrimination. The module may be constructed on a table top while the patient is standing or sitting. When the working kit is placed on the floor, the patient can simulate such working conditions as kneeling or squatting, lying on the side or in a supine position for overhead tasks. The unique feature of this module's construction is the amount of workspace confinement, which can be controlled by removing or adding shelves. This module's construction is illustrated in FIGS. 6–10 where a series of panels are bolted together to form the standard assembly module. As may be seen from FIGS. 6 and 6A, the modules are constructed by joining together separate panels with right angle brackets 34. These right angle brackets 34 are designed so that, when the panels are placed together, the overlapping right angle brackets 34 will rest one on top of the other so that the upper surface of the right angle brackets is flush with the edges of the panels. This is illustrated, for example, in FIG. 6A.

Figure 8:
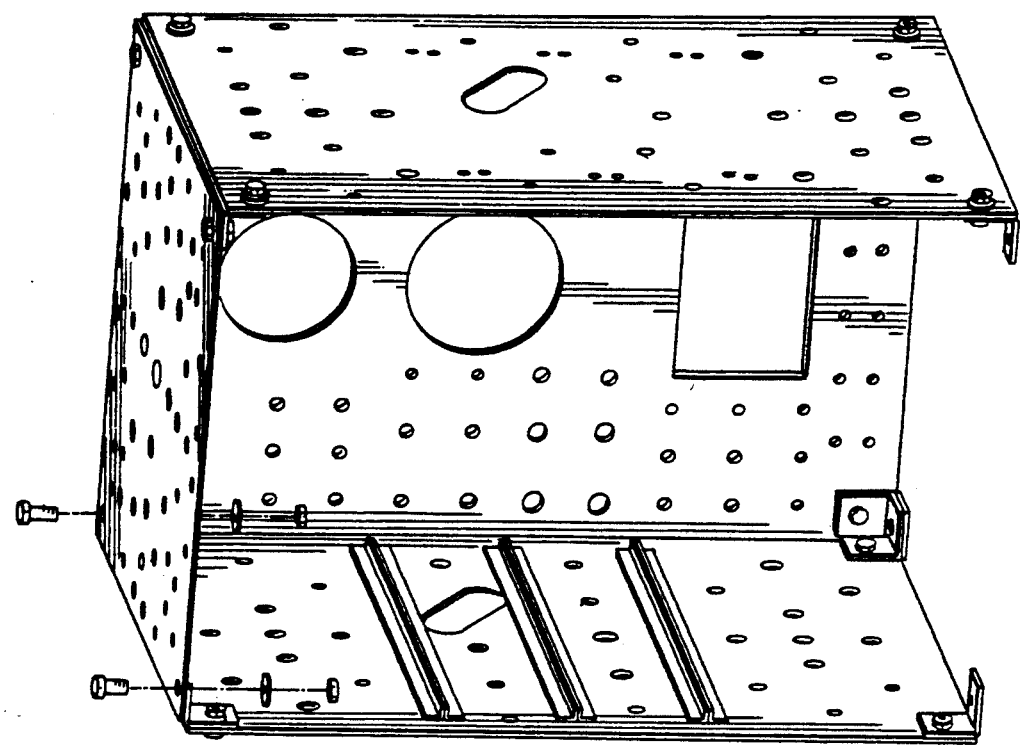
FIG. 8 shows an assembly including a middle panel, left and right panels, and a top panel.
Figure 7:
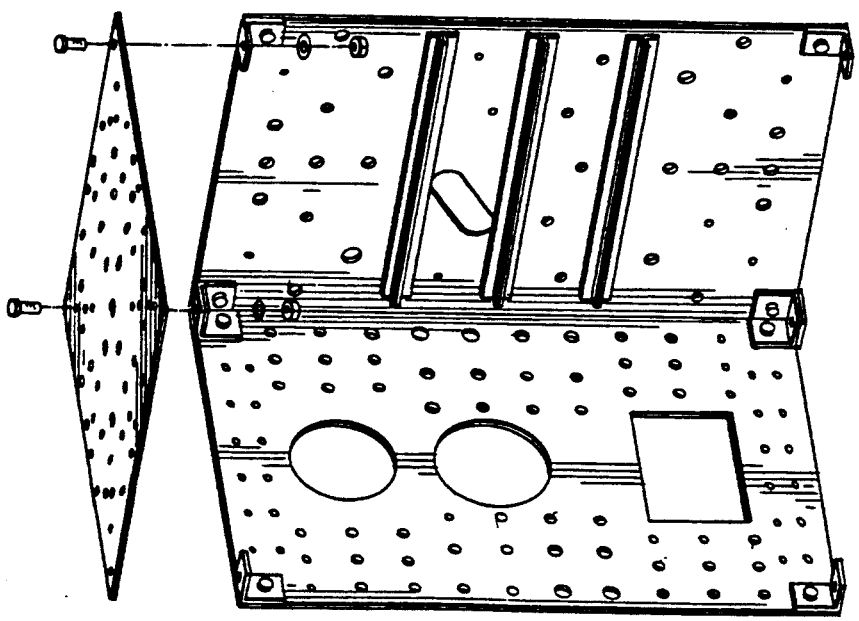
FIG. 7 shows a middle panel bolted to a left-hand panel and indicates how the top panel may be fastened to the middle and left panels.
Figure 10:
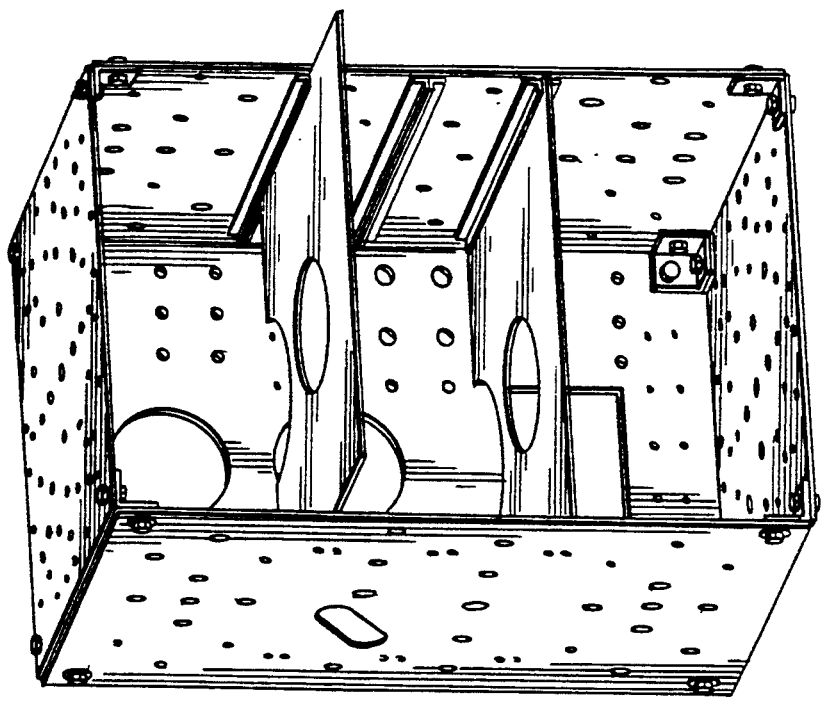
FIG. 10 is the assembled workstation of FIG. 9 including two shelves in the "standard assembly position".
Figure 9:
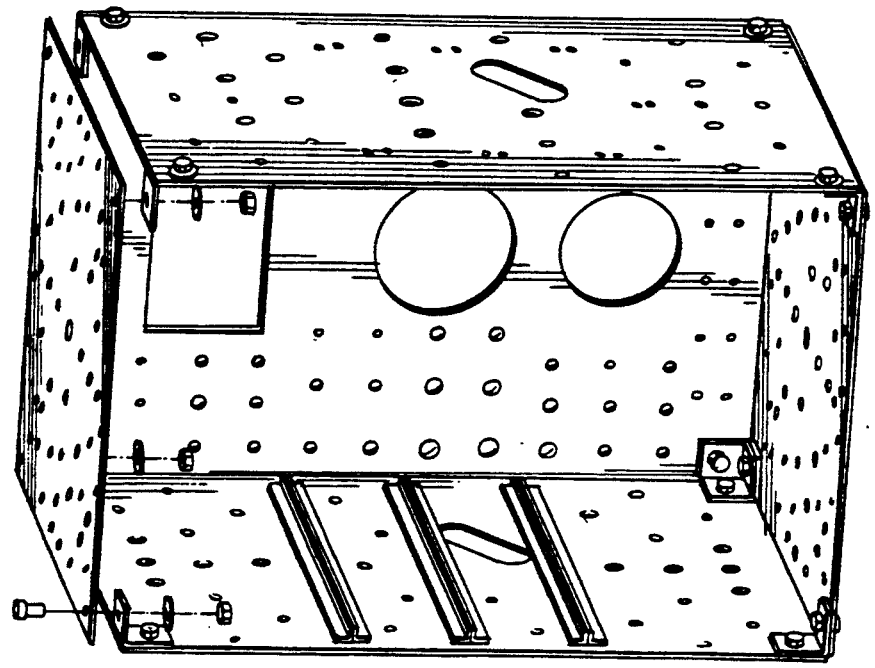
FIG. 9 is an assembly including middle, left, right, top and bottom panels.

FIGS. 7, 8 and 9 show the progressive development of the standard module and FIG. 10 shows the complete module. Depending upon the degree of confinement of activity required, the number of shelves 28 that slide into shelf fittings 36 may be varied. FIG. 10 shows two shelves but has a provisional third shelf bracket. Once the patient has assembled the module of FIG. 10, he may then be assigned the task of attaching nuts, bolts and washers to any of the panels. He may also pass wires or threads through the holes in a preselected pattern to further develop fine motor skills.

Figure 11:
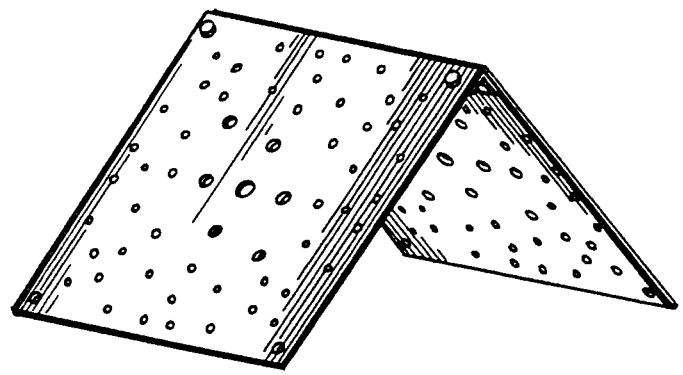
FIG. 11 is a "two panel position" showing a top and bottom panel fastened with right angle brackets.
Figure 12:
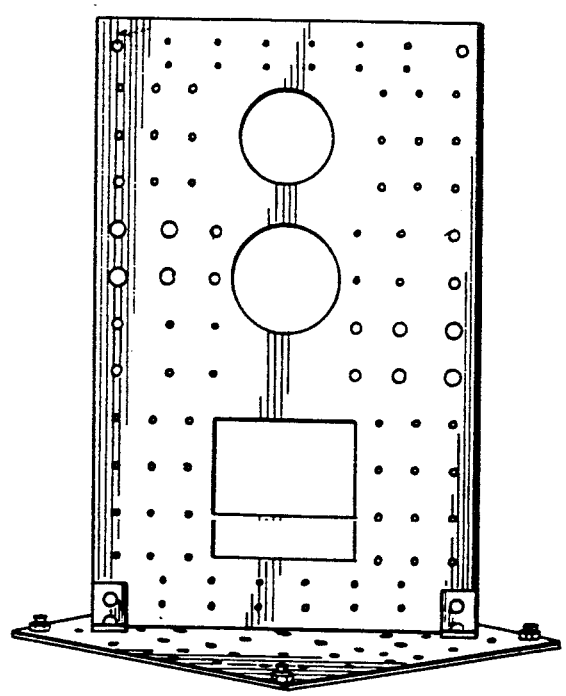
FIG. 12 is a "vertical 45° angle assembly" showing a vertical middle panel mounted at 45° across a bottom panel.
Figure 13:
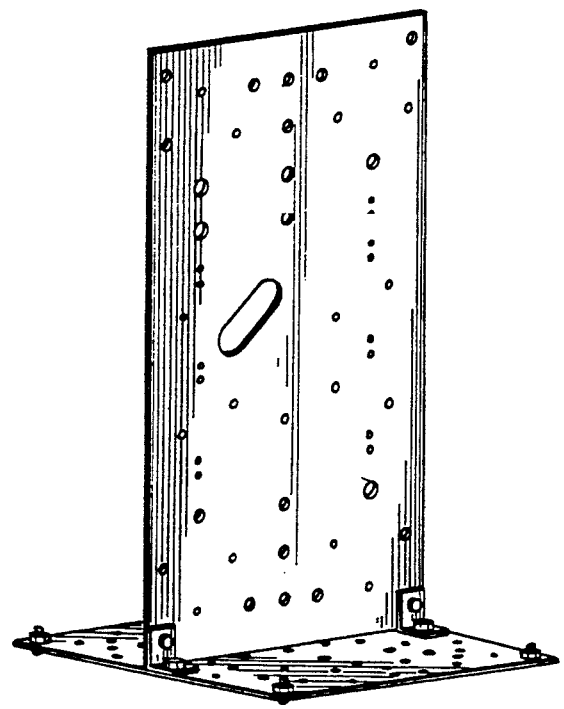
FIG. 13 is a "perpendicular assembly," showing a left-hand panel mounted perpendicular to a bottom panel.

A more simple, beginning assembly, for someone with limited attention span and problem solving skills, is a two-panel embodiment. In the first of these, the "right angle assembly" shown in FIG. 11, two panels are attached at right angles. This simple assembly requires a fair degree of strength and endurance. In two other embodiments, the perpendicular and vertical 45° angle assemblies, shown in FIGS. 12 and 13, the assembly exercises visual directionality, crossing the midline and spatial relationship skills.

Figure 14:
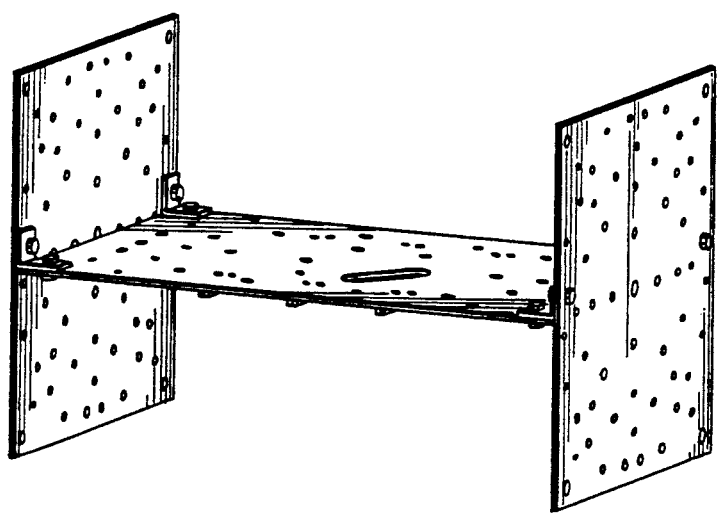
FIG. 14 is a "three panel horizontal assembly" showing end panels, top and bottom panels, centered and attached at right angles to each end of a horizontal left panel.
Figure 15:
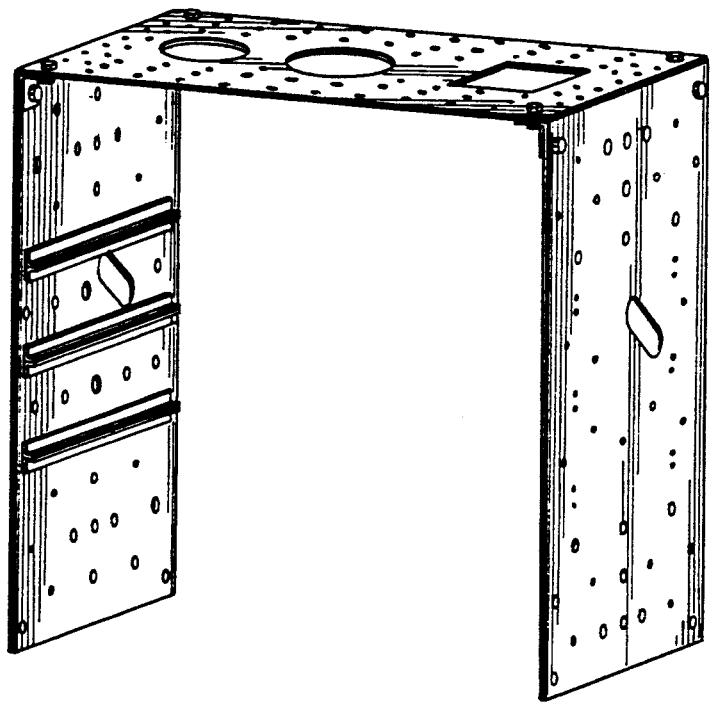
FIG. 15 is a "wide overhead assembly" showing a middle panel with a right panel attached a right angles at one end and a left panel attached at right angles at the other end to form an inverted U-shape.
Figure 16:
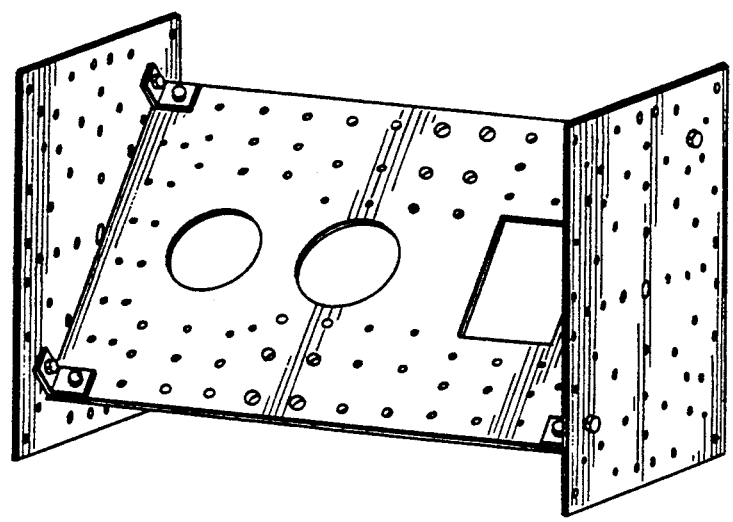
FIG. 16 is a "45° angle assembly" showing two end panels, top and bottom panels, to each of which is attached one end of a middle panel, at 45°.

There are at least 3 "three-panel positions," including the wide overhead assembly shown in FIG. 15, the horizontal assembly shown in FIG. 14, and the 45° angle assembly shown in FIG. 16. The wide overhead assembly promotes the whole range of body motion, overhead reaching and muscle endurance. While this assembly is simple, it requires basic problem solving skills and design application skills. The patient can work on this assembly in supine, side lying, kneeling, or squatting positions. In the horizontal assembly, the patient concentrates on the upper extremity range of motion, especially shoulder rotation, and pronation or supination. The assembly incorporates design replication, recognition of spatial relationships, and crossing the midline. This module is best assembled on a table top. However, the kit could also be placed on the floor to provide a confined work space while the patient uses body positions, such as side-lying or lying supine, while constructing the assembly. Finally, the 45° angle assembly provides the patient with an opportunity for shoulder and trunk motions while concentration on all wrist motions. This assembly is cognitively stimulating and incorporates attention to detail, design replication, and also allows for a visually occluded work space. The assembly is best utilized if placed on a table top.

Figure 17:
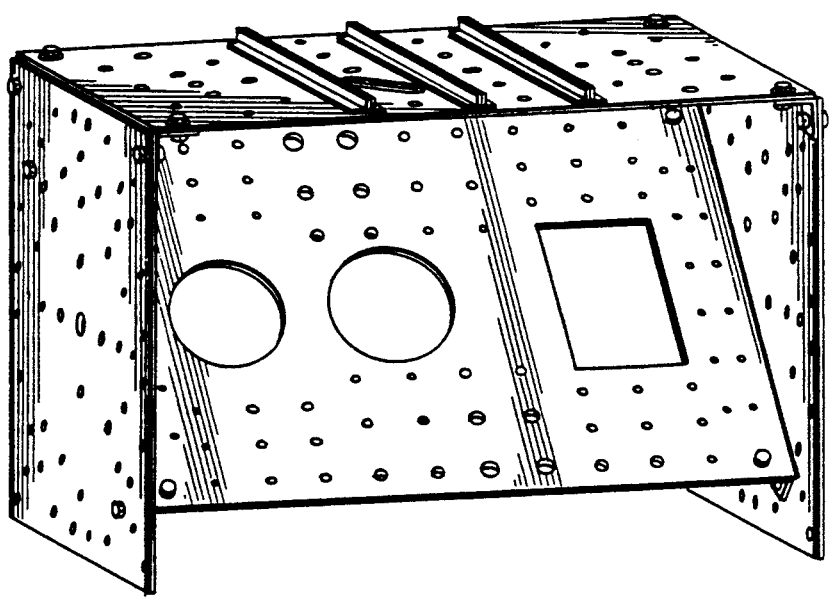
FIG. 17 is the 45° angle assembly of FIG. 16 with a left- or right-hand panel mounted horizontally above the angled middle panel.
Figure 18:
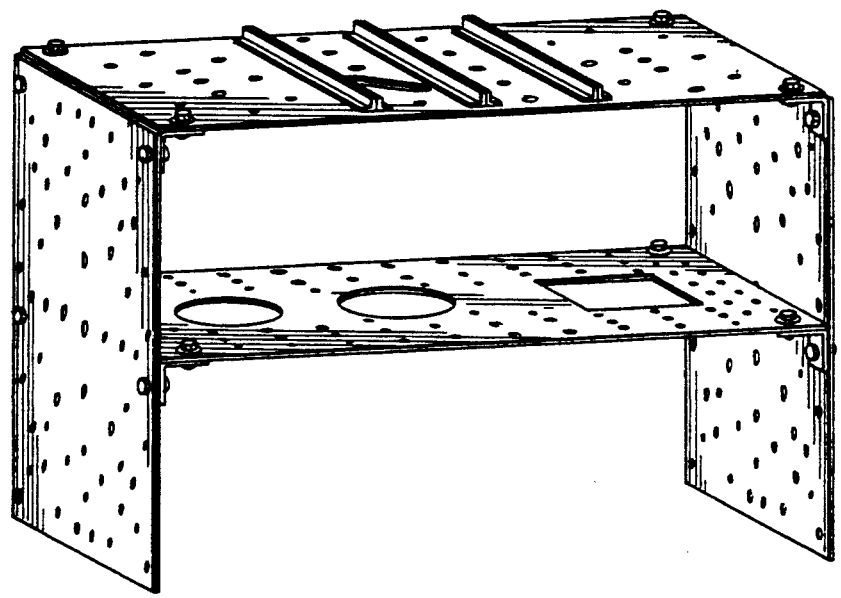
FIG. 18 is a "parallel assembly" showing two end panels, top and bottom panels, the upper ends of which are attached to the ends of a left or right panel while the centers are attached to a middle panel to form an A-shaped structure.
Figure 19:
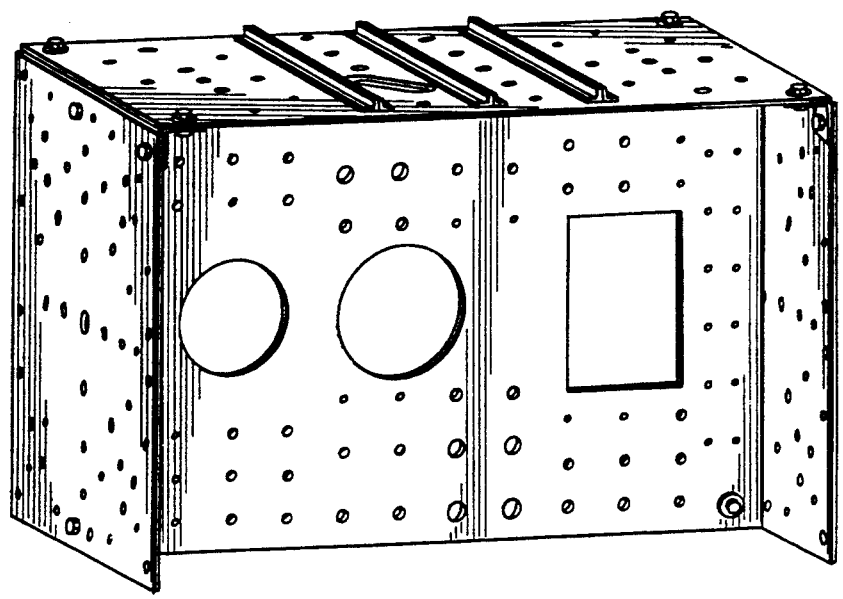
FIG. 19 is a "perpendicular assembly," which is similar to the middle panel assembly of FIG. 17 except that the middle panel is not mounted at 45° but is mounted perpendicularly.

There are at least three embodiments of a "double obstacle position." These include the middle panel module shown in FIG. 17, the parallel assembly module shown in FIG. 18, and the perpendicular assembly shown in FIG. 19. The parallel assembly provides the patient with the opportunity for gross motor coordination and internal and external shoulder rotation. It also provides lateral trunk motion and the opportunity to improve balance. The patient can be assigned the task of attaching nuts, bolts and washers to any of the panels. As an option, thread or wire may be strung through the panels to simulate wiring tasks using fine motor coordination. The assembly requires the use of depth perception and the exercise of spatial relationship skills. The patient could assemble this module horizontally on a table, sitting or standing, or the kit may be placed on the floor so that the patient may assemble it in the supine or side lying body positions. In the 45° angle assembly, the patient is provided with the opportunity for complete upper extremity range of motion and all wrist motions.

Assembly incorporates visual sequencing, crossing the midline, positioning in space, motor planning, and replication of details. Assembly is a relatively cognitively challenging activity. The workstation kit should be positioned on a table top for assembly by a patient in either the sitting or standing positions. In the perpendicular assembly, the ranges of wrist motions are emphasized. This position incorporates visual sequencing, crossing the midline, motor planning, and replication of details, and is intended to be cognitively challenging.

Figure 20:
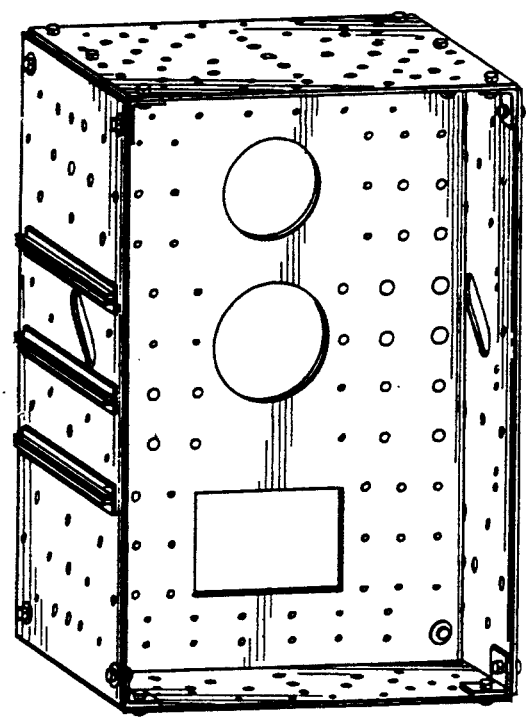
FIG. 20 is the "perpendicular assembly" of FIG. 19 with a panel mounted onto the free ends of the top and bottom panels.
Figure 21:
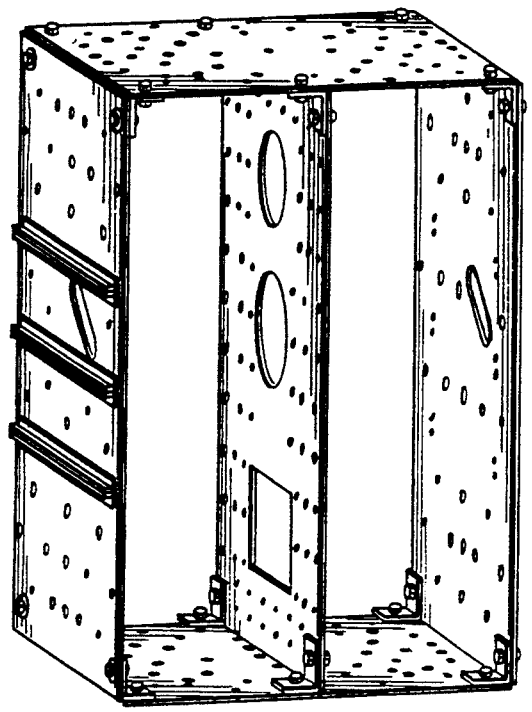
FIG. 21 is the A-shaped parallel assembly of FIG. 18 with a panel mounted to the free ends of the top and bottom end panels.
Figure 22:
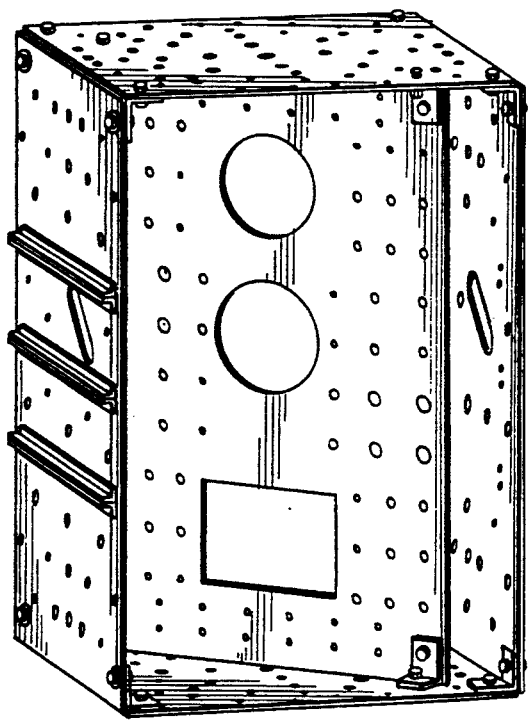
FIG. 22 is the 45° assembly of FIG. 17 with a panel attached to the free ends of the top or bottom end panels.

The invention multi-function workstation kit may also be assembled into several "triple obstacle positions." These include the perpendicular assembly of FIG. 20, the parallel assembly of FIG. 21 and the 45° angle assembly of FIG. 22. Typically, the workstation kit is placed on a table top and the patient assembles the module on the table top as shown. Assembly of the perpendicular module of FIG. 20 requires the whole range of body motions, extreme wrist range of motions, shoulder and overhead activity, and diagonal reaching. Cognitively, assembly requires crossing the midline as well as replication of detail, working within a visually occluded work space, and the exercise of visual directionality. In the parallel assembly of FIG. 21, the patient exercises gross motor coordination, vertical reaching, and works within a confined work space. Assembly also maximizes upper extremity endurance. The patient can be assigned the task of attaching nuts, bolts and washers to any of the panels. String may be threaded through the panels to simulate wiring tasks for the exercise of fine motor skills. Assembly requires organizational skills, the capability to replicate details, recognition of spatial relationships, and spatial depth perception. Typically, the assembly is carried out on a table top while the patient is sitting or standing. However, assembly can also be performed on the floor while the patient is in a kneeling or squatting position. The module of FIG. 22 provides for the full range of body motion, with an emphasis on prehension and tool handling within a limited work space. The assembly is challenging and stimulating requiring depth perception, motor planning, and spatial perception. Assembly may be carried out on a table top.

Figure 23:
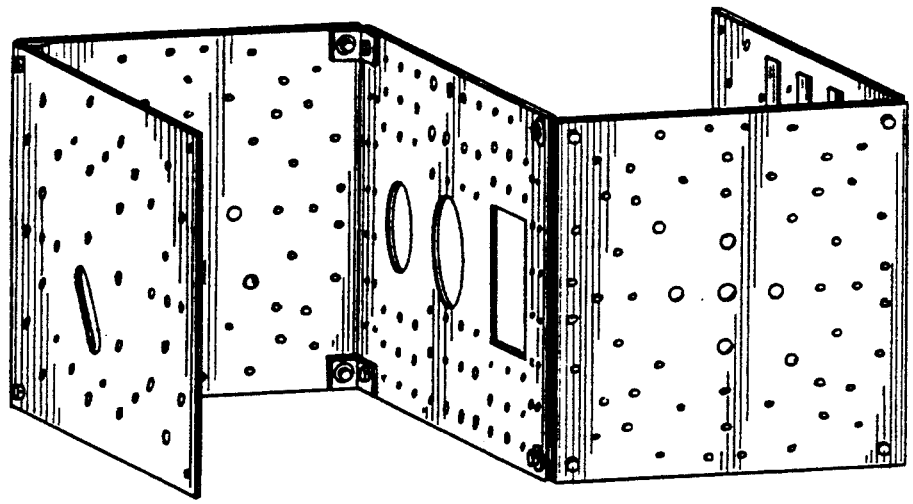
FIG. 23 is a "three person workstation" showing five panels attached at right angles to each other with right angle brackets to form an S-shape.
Figure 24:
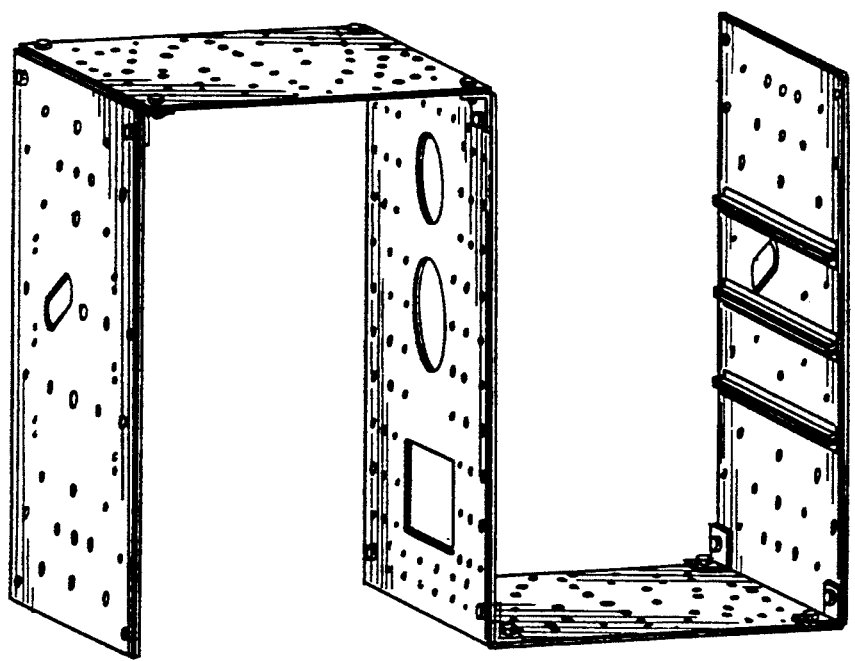
FIG. 24 is the S-shaped structure of FIG. 23 in a vertical position.

The invention multi-function workstation kit may also be assembled into a "three person workstation." These three person workstations are illustrated in FIGS. 23 and 24. Their assembly utilizes trunk rotation while standing. They also require the exercise of gross motor skills, tool handling with either low or high torque. The assembly demands a high ability to replicate detail, discriminate between left and right, and spatial depth perception. These workstations should be assembled vertically, or horizontally, on a table top.

Figure 25:
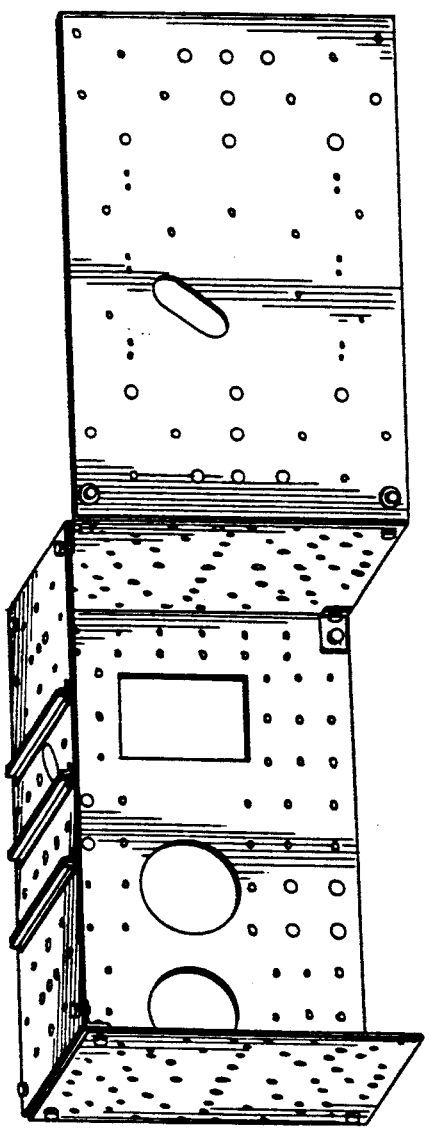
FIG. 25 is a "single extension assembly" for extended trunk positions, including a horizontal middle panel to which is attached at each end top and bottom panels, and to which is further attached, on the top side, a right- or left-hand panel to form an enclosed shape. A left- or right-hand panel is then attached at right angles to one of the end panels.
Figure 26:
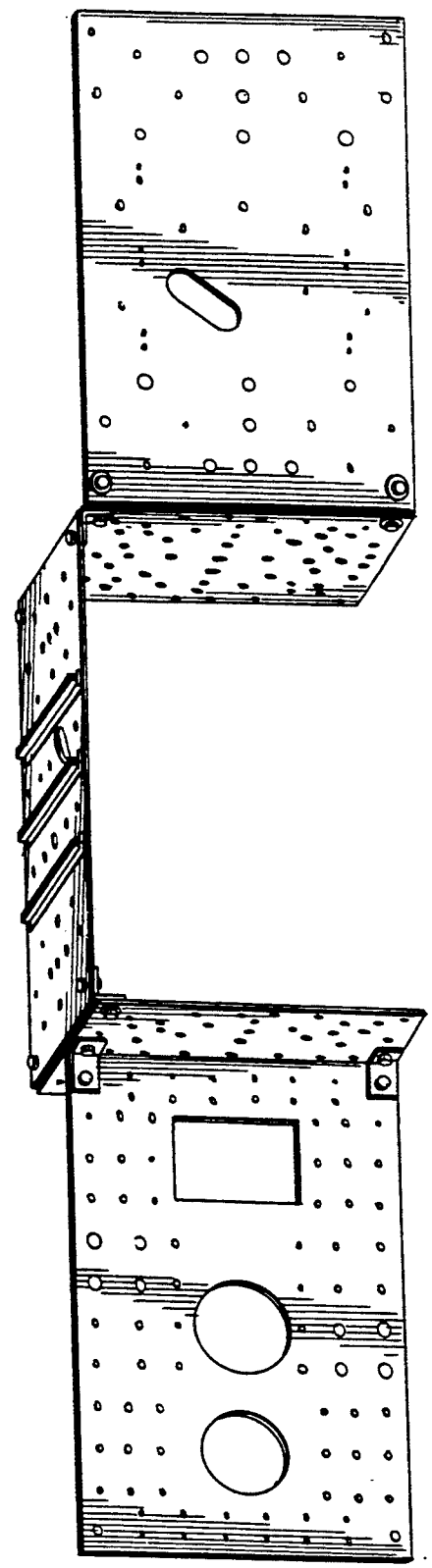
FIG. 26 is a "double extension assembly" wherein the middle panel of the single extension assembly of FIG. 25 is relocated to a position perpendicular to and at the center of the top or bottom panel.

The workstation may also be assembled into at least two "extended trunk positions." The single extension assembly or module is shown in FIG. 25; the double extension assembly in FIG. 26. Both of these extension assemblies require the total range of body motion with full trunk rotation and reaching. Assembly may be carried out while the patient is standing, sitting, squatting, lying on its side or supine. Horizontal and diagonal reaching exercises can also be achieved. The assemblies are cognitively challenging and require complex motor planning and problem solving skills. Left and right discrimination and replication of details are also necessary. The single extension assembly is best utilized on a table top, but could be constructed while lying on the side on the floor. Construction of the double extension assembly may be carried out on a table top by one or more patients. The module may also be placed on the floor so that patients may crawl into the open areas which allow for activities such as extreme trunk rotation and reaching.

FIG. 27 shows an assembly, "the overhead shoulder position," which incorporates the whole body range of motion, improving muscle endurance and strengthening of muscles, as well as reaching and bending, during construction. The patient may be standing, sitting, kneeling or squatting during assembly. Assembly requires a high level of abstract thinking, organizational skills, and a high level of replication of detail. Similarly, the kneeling or squatting position of FIG. 28 also requires a high range of physical activities, cognitive and perceptional motor skills and may be assembled in the standing, sitting, kneeling or squatting positions.

Figure 29:
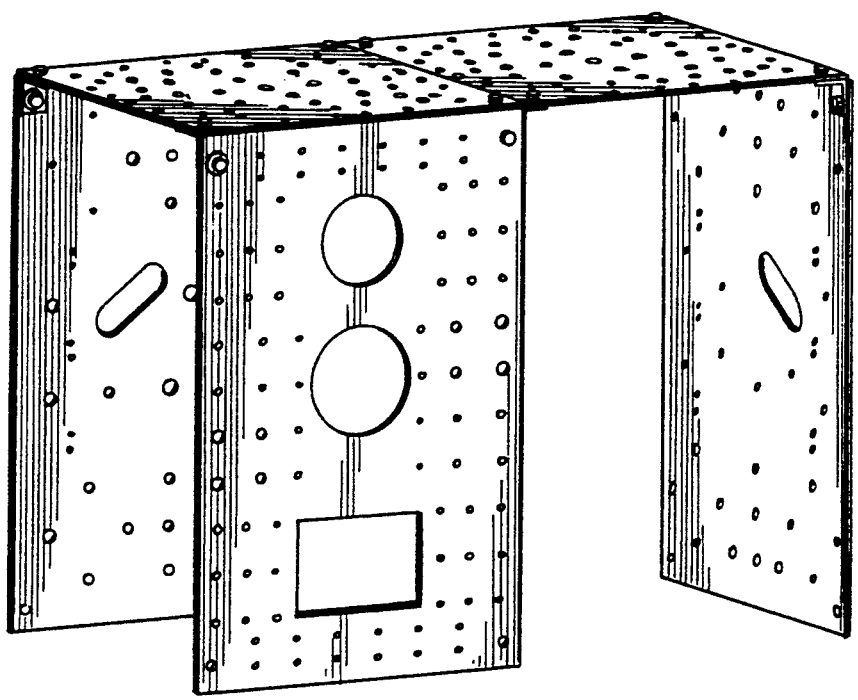
FIG. 29 is an assembly for exercising in the long overhead position, position 1.
Figure 30:
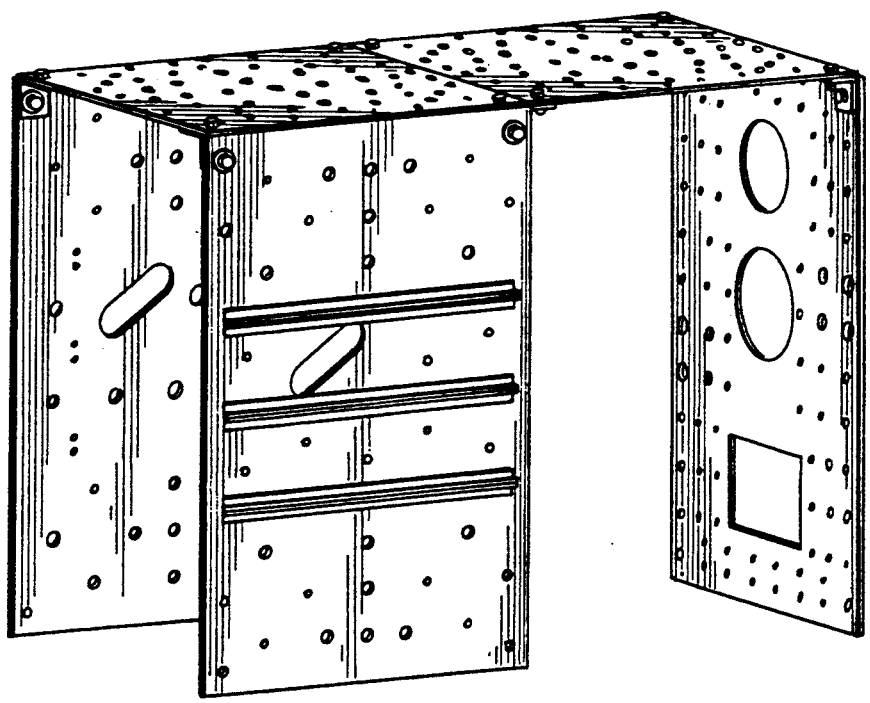
FIG. 30 is an assembly for exercising in the long supine or side lying overhead position of FIG. 29 but with the panels interchanged.

Finally, the long overhead positions shown in FIGS. 29 and 30 promote the whole range of body motion during construction. These include reaching into all planes of motion, muscle endurance and strengthening. Furthermore, the module can provide confined work space simulation and assists in developing overhead work tolerance. Assembly requires a high level of attention span, visual skill, depth perception, sequencing of tasks, and abstract thinking. When assembled on a table top, it is possible for two or more patients to work simultaneously. When placed on the floor, the assembly allows the patient to crawl inside and work in supine or side lying body positions.

Having described the invention above, various modifications of the techniques, procedures, material and equipment will be apparent to those in the art. It is intended that all such variations within the scope and spirit of the appended claims be embraced thereby.

What is claimed is:

1. A method of rehabilitating the muscles and neurological pathways of patients that have been subjected to physical or neurological trauma, comprising:
   (a) selecting a therapeutic workstation kit for rehabilitation of muscular and neurological functions comprising:
      (1) a side panel having a top edge, a bottom edge, and two sides, and having a slot for grasping and lifting, said side panel further having spaced holes at least along the perimeter of the panel for accepting bolts to allow connection to another panel with right angled elbows;
      (2) a middle panel having a top edge, a bottom edge, and two sides, and having at least one aperture sized to permit the insertion of a hand and arm therethrough, said middle panel being provided with spaced holes for bolts at least along the perimeter of the panel to allow connection of the middle panel to another panel with right angled elbows; and
      (3) a top panel, said top panel having sides, related in length to the top sides of the side and middle panels, so that the top panel may be affixed at right angles to said middle and side panels with right angled elbows;
   (b) manipulating the panels of the kit and interconnecting said panels to each other with right angled elbows to form a module; and
   (c) exercising the traumatized muscles or neurological pathways by the manipulating and assembling, thereby performing a therapeutic function.

2. The method of claim 1 further comprising fitting shelf brackets onto two opposing panels in the module of step (b) and sliding a shelf into the brackets to restrict workspace for exercising the patient's muscles in the restricted workspace.

3. The method of claim 1 further comprising threading wire through the holes to exercise fine motor skills.

4. The method of claim 1, wherein the step (a)(3) of selecting comprises selecting a square top panel having sides equal in length to the top sides of the side and middle panels.

* * * * *